(12) United States Patent
Beranek et al.

(10) Patent No.: US 10,761,268 B1
(45) Date of Patent: Sep. 1, 2020

(54) FIBER OPTIC MECHANICAL SPLICE

(71) Applicant: United States of America, as represented by the Secretary of the Navy, Patuxent River, MD (US)

(72) Inventors: Mark Beranek, Hollywood, MD (US); Nicholas Peterson, Minneapolis, MN (US); Bradley Yost, Mechanicsville, MD (US); Michael Block, St. Leonard, MD (US); Elizabeth Meiser, Baltimore, MD (US); Amanda Cabrera, White Plains, MD (US); Frederick Lancaster, Dameron, MD (US); Justin Klock, Lexington Park, MD (US); William Boyden, Hughesville, MD (US)

(73) Assignee: The United States Government as Represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 16/700,294

(22) Filed: Dec. 2, 2019

(51) Int. Cl.
  *G02B 6/255* (2006.01)
  *G02B 6/12* (2006.01)
(52) U.S. Cl.
  CPC ........... *G02B 6/255* (2013.01); *G02B 6/2558* (2013.01); *G02B 2006/12192* (2013.01)
(58) Field of Classification Search
  CPC .................. G02B 6/255; G02B 6/2558; G02B 2006/12192
  See application file for complete search history.

(56) References Cited

U.S. PATENT DOCUMENTS

| | | | | |
|---|---|---|---|---|
| 5,341,448 | A * | 8/1994 | Huebscher | G02B 6/3809 385/68 |
| 5,469,522 | A * | 11/1995 | Fan | G02B 6/3801 385/72 |
| 7,306,382 | B2 | 12/2007 | Qian et al. | |
| 7,410,308 | B2 | 8/2008 | Qian et al. | |
| 8,103,144 | B1 | 1/2012 | Zhao et al. | |
| 10,641,960 | B1 * | 5/2020 | Beranek | G02B 6/2555 |
| 2009/0324177 | A1 * | 12/2009 | Qian | G02B 6/2558 385/95 |

\* cited by examiner

*Primary Examiner* — Daniel Petkovsek
(74) *Attorney, Agent, or Firm* — Mark O. Glut; NAWCAD

(57) ABSTRACT

A fiber optic mechanical splice for splicing input and output optical fiber. The splice includes a capillary tube for enclosing fiber ends of the input and output optical fiber cables, two metallic cable-splice bridging flanges for insertion onto the input and output optical fiber cable jackets, a first metallic crimping tube, a second metallic crimping tube, a first protection tube, a second protection tube, and polyurethane tape. The fibers extending from the input and output optical fibers can be frustoconically inserted into a corresponding bridging flange. The crimping tubes enclose corresponding cable ends and bridging flanges. The first protection tube encloses the crimping tubes, while the second protection tube encloses the first protection tube and the tape is disposed over the second protection tube, the bridging flanges, and the crimping tubes.

3 Claims, 4 Drawing Sheets

FIBER OPTIC MECHANICAL SPLICE

STATEMENT OF GOVERNMENT INTEREST

The invention described herein may be manufactured and used by or for the Government of the United States of America for governmental purposes without payment of any royalties thereon or therefor.

CROSS-REFERENCE

The present application is related to U.S. patent application Ser. No. 16/151,992, filed Oct. 4, 2018, entitled "Method and Apparatus for Assembling a Fiber Optic Splice." U.S. patent application Ser. No. 16/151,992 is incorporated by reference herein, and is not admitted to be prior art with respect to the present invention.

BACKGROUND

Optical fiber is a flexible transparent fiber made of silica or plastic. Optical fiber has become a valuable component of electronic devices, as it permits for longer transmission distances and higher bandwidth than cable wires. Despite the many benefits of optical fiber, one of the main drawbacks is the fragility of the fiber, as compared to cable wires. Optical fiber can be used in a number of applications, including as a medium for telecommunication and computer networking, sensor applications, and power transmission. As the number of applications increase, there is a growing demand for mechanisms that repair optical fiber. Existing mechanisms for repairing optical fiber include fusion splicing and mechanical splicing.

Fusion splicing is the act of joining two optical fibers end-to-end using heat (e.g. via electric arc, laser, gas flame, etc.). One goal of fusion splicing is to fuse the two fibers together in such a way that light passing through the fibers is not scattered or reflected back by the splice. Another goal of fusion splicing is to create a splice and surrounding region that are almost as strong as the original fiber itself. Fusion splicing is a widely accepted form of repairing optical fiber; however, fusion splicing cannot be used in many situations. In applications that are sensitive to heat, such as environments with electronic components, particularly in a military aircraft environment, fusion splicing may not be a viable option. Fusion splicing can also be problematic in explosive environments. For example, a fueled aircraft could have an increased chance of explosion due to combustible fumes in the vicinity of the splice.

Existing mechanisms for mechanical fiber splices are designed to be quicker and easier to install than fusion splicing; however, there is still the need for stripping, careful cleaning, and precision cleaving of the optical fibers. Currently, fiber ends are aligned and held together by a sleeve or a high precision capillary tube, often using a resin or clear index-matching material that enhances the transmission of light across the joint. Such joints typically have higher optical loss and are less robust than fusion splices, especially where imperfect contact is made between the two optical fiber ends within the resin.

U.S. Pat. No. 7,410,308, issued on Aug. 12, 2008 and entitled "Fiber Optic Cable Splice," addresses fiber optic cable splices; however, this solution only addresses splicing cables with one strength member. Furthermore, currently, no fiber optic mechanical splice is qualified to the Aircraft Mechanical Splice Military Specification (MIL-PRF 24623/7), which is incorporated herein. In addition, currently all aircraft fiber optic cabling is being repaired by replacement on a case-by-case basis. Thus, there is a need for a fiber optic mechanical splice that meets these requirements.

SUMMARY

The present invention is directed to a fiber optic mechanical splice with the needs enumerated above and below.

The present invention is directed to a fiber optic mechanical splice for splicing an input optical fiber cable and an output optical fiber cable each having a cable end, the fiber optic mechanical splice comprising: a capillary tube with open ends, the capillary tube for enclosing the ends of the input and output optical fibers, the capillary tube resides in a terafluoroethylene and perfluoromethyl vinyl ether copolymer tube; two metallic cable-splice bridging flanges for insertion onto the input and the output optical fiber cables and enclosing the cable ends of the input and the output optical fiber cables, the bridging flanges manufactured from pre-treated stainless steel, each bridging flange internally shaped such that the input and the output optical fiber cables can be frustoconically inserted into each corresponding metallic cable-splice bridging flange and each bridging flange can be frustoconically inserted into the corresponding open end of the terafluoroethylene and perfluoromethyl vinyl ether copolymer tube; a first metallic crimping tube and a second metallic crimping tube, each enclosing the corresponding cable end and the corresponding cable-splice bridging flanges, the crimping tubes manufactured from aluminum alloy anodized then sealed with a tri-valent chromium sealer; a first protection tube with stepped ends, the first protection tube for enclosing terafluoroethylene and perfluoromethyl vinyl ether copolymer tube, the first metallic crimping tube, and the second metallic crimping tube, the first protection tube manufactured from aluminum alloy anodized then sealed with a tri-valent chromium sealer; a second protection tube for enclosing the first protection tube, the second protection tube being Teflon tubing; and, polyurethane tape with a fiberglass carrier and backed with polytetrafluoroethylene, the tape disposed over the second protection tube and to and over the cable ends of the input and the output optical fibers, over the two metallic cable-splice bridging flanges, and over the first metallic crimping tube and the second metallic crimping tube, such that an environmental seal is created over the fiber optic mechanical splice.

It is a feature of the present invention to provide a fiber optic mechanical splice that is capable of being assembled by an avionics technician, field technician, or manufacturing technician.

It is a feature of the present invention to provide fiber optic mechanical splice that can pass MIL-PRF-24623/7 qualification.

It is a feature of the present invention to provide a fiber optic mechanical splice that can be utilized on a fiber optic cable that contains one or two strength members.

DRAWINGS

These and other features, aspects and advantages of the present invention will become better understood with reference to the following description and appended claims, and accompanying drawings wherein:

Figure 2:
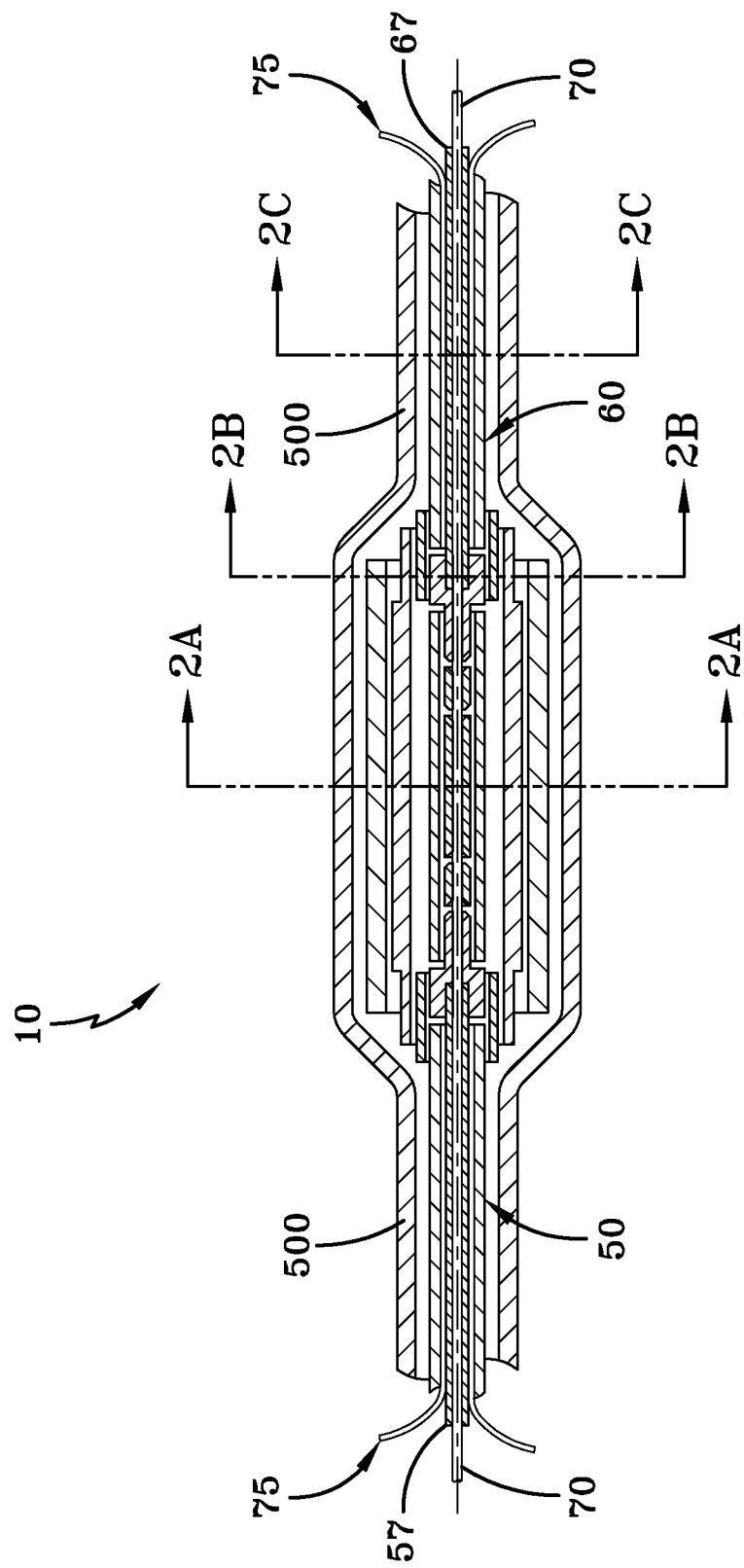
FIG. 2 is a side cross sectional view of an embodiment of the fiber optic mechanical splice.
Figure 2A:
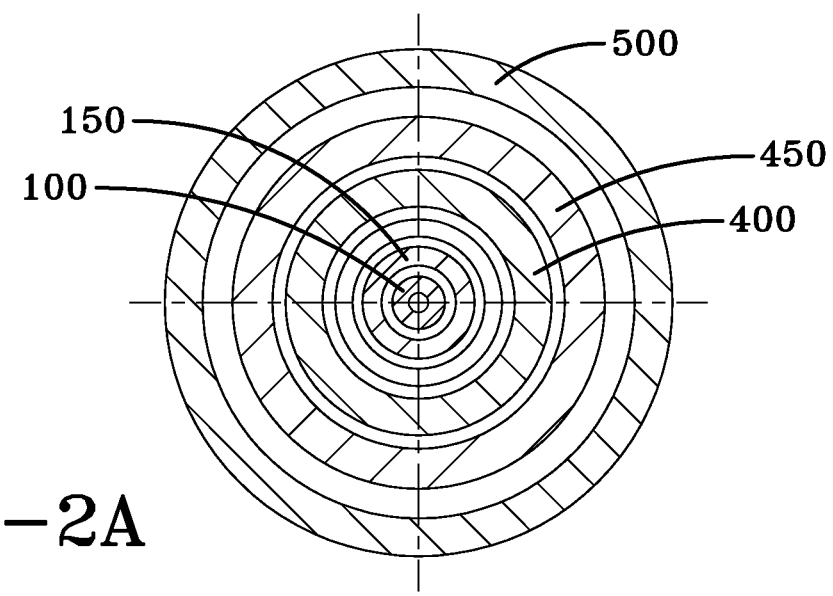
Figure 2B:
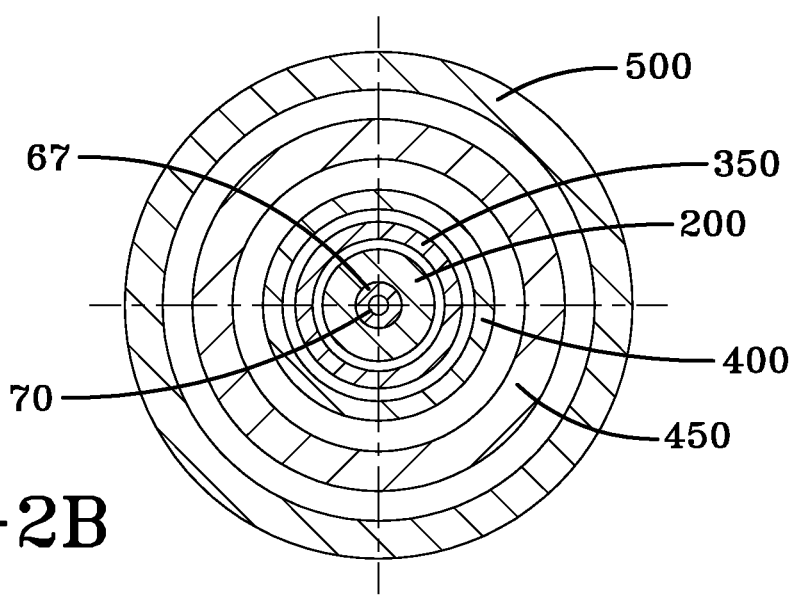
Figure 2C:
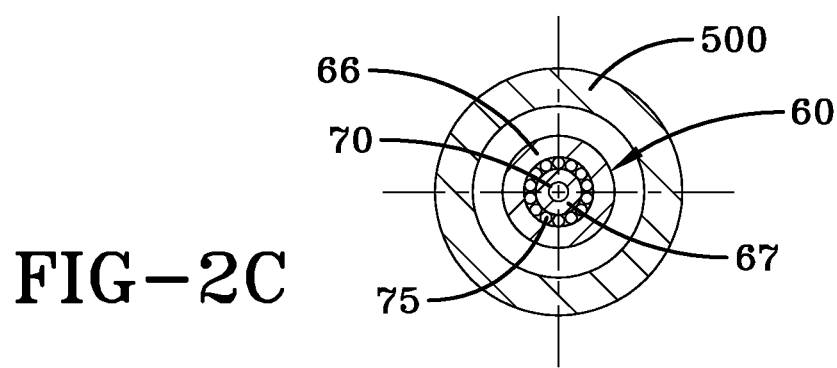
Figure 3A:
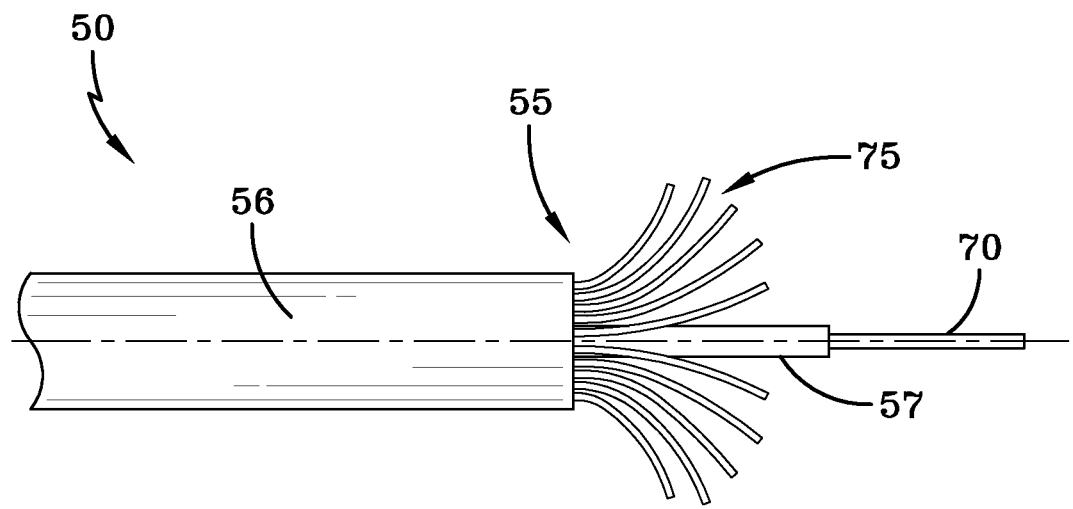
Figure 3B:
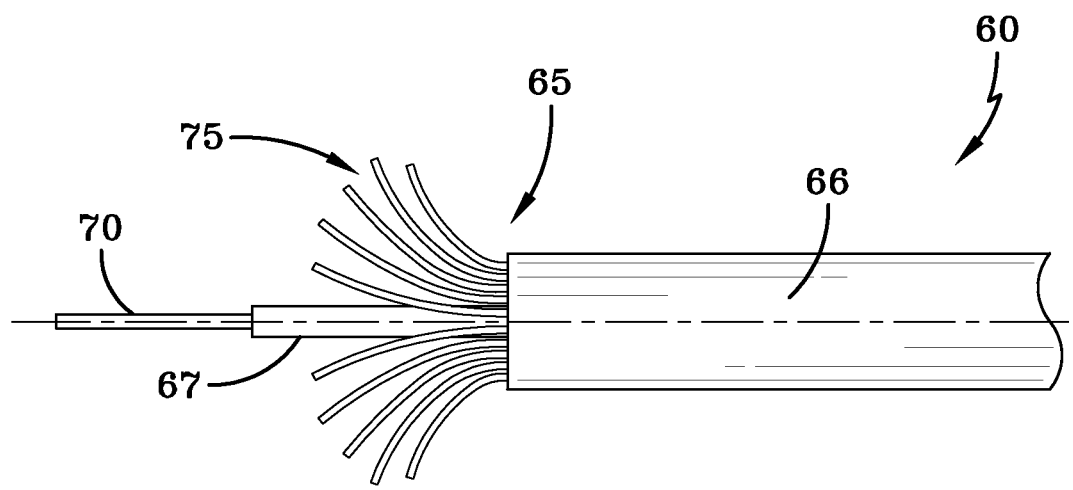

FIGS. 2A, 2B, and 2C are cross sectional views at various locations of FIG. 2; and, FIGS. 3A and 3B are side views of a portion of the input and the output optical fiber cables (after the fiber is prepared, prior to having the bridging flange put onto the cable).

DESCRIPTION

Figure 1:
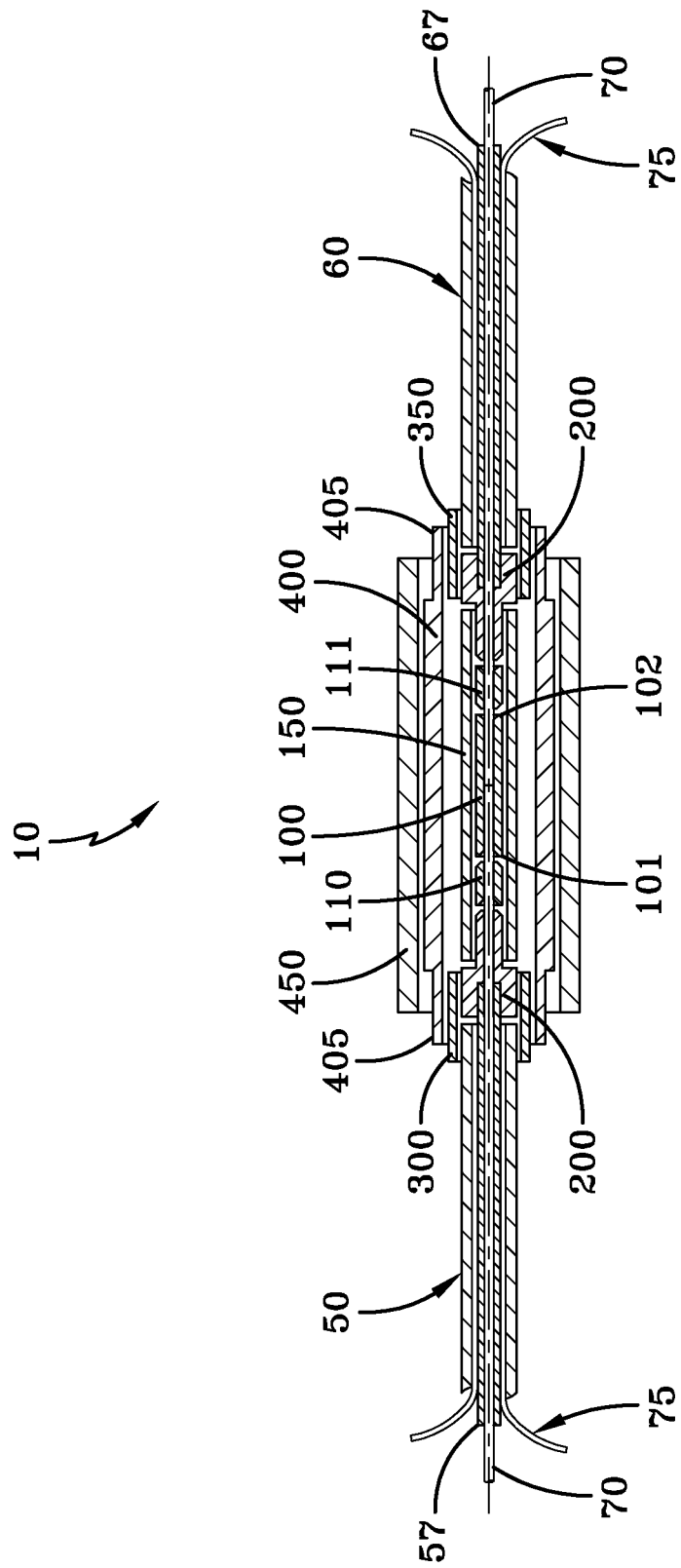
FIG. 1 is a side cross sectional view of an embodiment of the fiber optic mechanical splice (without the polyurethane tape)

The preferred embodiments of the present invention are illustrated by way of example below and in FIGS. 1-3. As seen in FIGS. 1 and 2, the fiber optic mechanical splice 10 is for splicing an input optical fiber cable 50 and an output optical fiber cable 60, each having, as shown in FIGS. 3A and 3B, fiber ends 70, a cable end 55, 65, an outer jacket 56, 66 and an inner jacket 57, 67 (the inner jacket can also be referred to as a buffer tube). The fiber optic mechanical splice 10 includes a capillary tube 100 for enclosing the fiber ends 70 of the input optical fiber cable 50, the output optical fiber cable 60, two metallic cable-splice bridging flanges 200, a first metallic crimping tube 300, a second metallic crimping tube 350, a first protection tube 400, a second protection tube 450, and polyurethane tape 500. The capillary tube 100 has two open ends 101, 102 and resides in a terafluoroethylene and perfluoromethyl vinyl ether copolymer tube 150 (can also be referred as an ultraviolet light transparent tube). The two metallic cable-splice bridging flanges 200 are for insertion onto the input optical fiber cable 50 and the output optical fiber cable 60 and enclosing the cable ends 55, 65 of the input optical fiber cable 50 and the output optical fiber cable 60. The bridging flanges 200 are manufactured from pre-treated stainless steel, and each bridging flange 200 is internally shaped such that fiber 70 extending from the input optical fiber cable 50 and the output optical fiber cable 60 can be frustoconically inserted into each corresponding metallic cable-splice bridging flange 200 and each bridging flange 200 (with the inserted fiber 70 and the inner jackets 57,67) can be frustoconically inserted into the corresponding open end 101 or 102 of the capillary tube 100. The first metallic crimping tube 300 and the second metallic crimping tube 350 each enclose a corresponding cable end having a cable strength member 75, and a corresponding cable-splice bridging flange 200. The crimping tubes 300, 350 are manufactured from aluminum alloy anodized then sealed with a tri-valent chromium sealer. The first protection tube 400 has stepped ends 405, and encloses the first metallic crimping tube 300, the second metallic crimping tube 350, and the terafluoroethylene and perfluoromethyl vinyl ether copolymer tube 150. The first protection tube 400 is manufactured from pre-treated aluminum alloy anodized then sealed with a tri-valent chromium sealer. The second protection tube 450 encloses the first protection tube 400 and is Teflon tubing. The polyurethane tape 500 has a fiberglass carrier and is backed with polytetrafluoroethylene, and disposed over the second protection tube 450 and to and over the cable ends 55, 65 of the input optical fiber cable 50 and the output optical fiber cable 60, over the two metallic cable-splice bridging flanges 200, and over the first metallic crimping tube 300 and the second metallic crimping tube 350, such that an environmental seal is created over the fiber optic mechanical splice 10.

In the description of the present invention, the invention will be discussed in a military aircraft environment; however, this invention can be utilized for any type of application that requires use of a mechanical splice.

In a preferred embodiment, the capillary tube 100 further includes capillary tube end caps 110, 111, each capillary tube ends cap 110, 111 is disposed at a corresponding open end 101, 102 and inside the terafluoroethylene and perfluoromethyl vinyl ether copolymer tube 150. In another embodiment, the capillary tube open ends 101, 102 are conically shaped. Alternatively, heat shrink tubing can be used to replace the polyurethane tape 500 with fiberglass carrier and backed with polytetrafluoroethylene. Also, the fiber end 70 extending from each inner jacket 57 and 67 is cleaved and/or polished.

When introducing elements of the present invention or the preferred embodiment(s) thereof, the articles "a," "an," "the," and "said" are intended to mean there are one or more of the elements. The terms "comprising," "including," and "having" are intended to be inclusive and mean that there may be additional elements other than the listed elements.

Although the present invention has been described in considerable detail with reference to certain preferred embodiments thereof, other embodiments are possible. Therefore, the spirit and scope of the appended claims should not be limited to the description of the preferred embodiment(s) contained herein.

What is claimed is:

1. A fiber optic mechanical splice for splicing an input optical fiber cable to an output optical fiber cable, each having fibers, a cable end, an outer jacket, and an inner jacket, the fiber optic mechanical splice comprising:

a capillary tube with open ends, the capillary tube for enclosing the cable ends of the input and the output optical fibers, the capillary tube resides in a terafluoroethylene and perfluoromethyl vinyl ether copolymer tube;

two metallic cable-splice bridging flanges for insertion onto the input and the output optical fiber cable jackets and enclosing the cable ends of the input and the output optical fiber cables, the bridging flanges manufactured from pre-treated stainless steel, each bridging flange is internally shaped such that the fibers extending from the input and the output optical fiber cables can be frustoconically inserted into each corresponding metallic cable-splice bridging flange and the fibers extending from the input cable can be frustoconically inserted into a corresponding open end of the terafluoroethylene and perfluoromethyl vinyl ether copolymer tube;

a first metallic crimping tube and a second metallic crimping tube, each enclosing the corresponding cable end and the corresponding cable-splice bridging flanges, the crimping tubes manufactured from aluminum alloy anodized then sealed with a tri-valent chromium sealer;

a first protection tube with stepped ends, the first protection tube for enclosing the terafluoroethylene and perfluoromethyl vinyl ether copolymer tube, the first metallic crimping tube, and the second metallic crimping tube, the first protection tube manufactured from aluminum alloy anodized then sealed with a tri-valent chromium sealer;

a second protection tube for enclosing the first protection tube, the second protection tube being Teflon tubing; and, polyurethane tape with a fiberglass carrier and backed with polytetrafluoroethylene, the tape disposed over the second protection tube and to and over the cable ends of the input and the output optical fibers, over the two metallic cable-splice bridging flanges, and over the first metallic crimping tube and the second metallic crimping tube, such that an environmental seal is created over the fiber optic mechanical splice.

2. The fiber optic mechanical splice for splicing of claim 1, wherein the capillary tube further includes capillary tube end caps, each capillary tube ends cap disposed at each open end and inside the terafluoroethylene and perfluoromethyl vinyl ether copolymer tube.

3. The fiber optic mechanical splice for splicing of claim 1, wherein the capillary tube open ends are conically shaped.

* * * * *